United States Patent
Albers

(10) Patent No.: US 7,730,240 B2
(45) Date of Patent: Jun. 1, 2010

(54) METHOD FOR CONTROLLING THE ACCESS TIMES TO A SYSTEM BUS AND COMMUNICATION MODULE

(75) Inventor: Thomas Albers, Minden (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 405 days.

(21) Appl. No.: 11/421,259

(22) Filed: May 31, 2006

(65) Prior Publication Data

US 2006/0274598 A1    Dec. 7, 2006

(30) Foreign Application Priority Data

Jun. 3, 2005    (DE)    .................... 10 2005 025 529

(51) Int. Cl.
   *G06F 3/00*    (2006.01)
(52) U.S. Cl. .................... 710/60; 702/89; 713/400
(58) Field of Classification Search .................... 710/60; 713/401
   See application file for complete search history.

(56) References Cited

U.S. PATENT DOCUMENTS

| | | | | |
|---|---|---|---|---|
| 5,680,596 A | * | 10/1997 | Iizuka et al. | ................ 713/600 |
| 6,832,326 B2 | * | 12/2004 | Kubo et al. | ................ 713/400 |
| 6,909,699 B2 | * | 6/2005 | Masunaga et al. | ........... 370/252 |
| 7,028,204 B2 | * | 4/2006 | Jammes et al. | .............. 713/400 |
| 7,219,155 B2 | * | 5/2007 | Asamoto et al. | ............ 709/233 |
| 2003/0014680 A1 | * | 1/2003 | Zielbauer | .................... 713/400 |

FOREIGN PATENT DOCUMENTS

| | | |
|---|---|---|
| DE | 103 24 001 A1 | 12/2004 |
| EP | 1 179 908 A1 | 2/2002 |

\* cited by examiner

*Primary Examiner*—Henry W. H. Tsai
*Assistant Examiner*—Elias Mamo
(74) *Attorney, Agent, or Firm*—Whitham Curtis Christofferson & Cook, PC

(57) ABSTRACT

A method for defining a cycle time for a transmission cycle on a system bus of a monitoring and/or control system having at least one communication module and at least one input/output module, which is connected to the communication module via the system bus for transmitting measurement and/or control signals and is intended to input and/or output measurement and/or control signals to field applications, the at least one communication module having a time control unit for controlling a transmission cycle which is constantly repeatedly carried out and has defined communication times for the communication and input/output modules which are connected to the system bus, comprises measuring the signal propagation times on the system bus and defining the cycle time for a transmission cycle on the system bus on the basis of the longest signal propagation time measured.

7 Claims, 1 Drawing Sheet

METHOD FOR CONTROLLING THE ACCESS TIMES TO A SYSTEM BUS AND COMMUNICATION MODULE

BACKGROUND OF THE INVENTION

1. Field of the Invention

The invention relates to a method for controlling the access times to a system bus of a monitoring and/or control system having at least one communication module and at least one input/output module, which is connected to the communication module via the system bus for transmitting measurement and/or control signals and is intended to input and/or output measurement and/or control signals to field applications, the at least one communication module having a time control unit for controlling a transmission cycle which is constantly repeatedly carried out and has defined communication times for the communication and input/output modules which are connected to the system bus.

The invention also relates to a communication module for a monitoring and/or control system, said module having a system bus interface for connecting subordinate input/output modules and having a time control unit for controlling a transmission cycle which is constantly repeatedly carried out and has defined communication times for the communication and/or input/output modules which are connected to the system bus.

2. Description of the Related Art

In order to control the communication processes on a system bus of a monitoring and/or control system, exact synchronization and the definition of access times for individual communication and input/output modules, which are connected to the system bus, are necessary in order to avoid access collision.

DE 101 43 972 A1 describes communication control for a process control system communication bus, which uses a communication schedule to control communication occurring on the communication bus. The communication schedule prescribes when each of the devices which are coupled to the bus can communicate on the bus. A test algorithm is used to detect the presence of devices which are connected to the communication bus.

EtherCAT: Die Beckhoff-Lösung für Echtzeit Ethernet [EtherCAT: The Beckhoff solution for real-time Ethernet] in: SPS Magazin, Issue 5+6/2003, pages 42 to 45 discloses a method for synchronizing a control system with input/output modules which are connected to one another via an Ethernet field bus. Each input/output module has a clock in order to control the access time to the Ethernet field bus. A master clock determines the propagation time offset with respect to individual secondary clocks of the distributed control system. The distributed clocks are corrected on the basis of the respective propagation time differences so that its highly accurate network-wide time base is available.

SUMMARY OF THE INVENTION

The problem of such monitoring and/or control systems is that, in order to ensure reliable operation, the transmission cycles or macrocycles which are used to define the communication times of the individual communication and input/output modules which are connected to the system bus must be designed, as a precaution, for the maximum permissible level of expansion of the monitoring/control system.

In order to optimize system bus utilization, it is an object of the present invention to provide an improved method for controlling the access times to a system bus of a monitoring and/or control system and to provide an improved communication module.

With the method for controlling the access times to a system bus of a monitoring and/or control system having at least one communication module and at least one input/output module, which is connected to the communication module via the system bus for transmitting measurement and/or control signals and is intended to input or output measurement and/or control signals to field applications, and a time control unit of a communication module for controlling a transmission cycle which is constantly repeatedly carried out and has defined communication times for the communication and input/output modules which are connected to the system bus, the object is achieved by the signal propagation times on the system bus preferably being measured in the boot phase of the monitoring and/or control system and by the cycle time for a transmission cycle on the system bus being defined on the basis of the longest signal propagation time measured.

The cycle time for the transmission cycle is thus variably set on the basis of measured signal propagation times rather than, as previously, being permanently prescribed taking into account the maximum permissible level of expansion of the monitoring and/or control system. This has the advantage that the transmission cycle for the system bus adapts flexibly to the actual signal transmission conditions of the monitoring/control system.

The method preferably has the steps of:
a) measuring the signal propagation times on the system bus and determining the longest signal propagation time;
b) determining the maximum data transfer rate on the basis of the longest signal propagation time;
c) using the minimum data transfer rate to determine the minimum cycle time of a transmission cycle; and
d) transmitting the minimum cycle time to all of the communication and input/output modules, which are connected to the system bus, in order to control the access times to the system bus.

The signal propagation times are preferably measured by the superordinate communication module which contains the time control unit, all of the signal propagation times between the communication module and the subordinate input/output modules and, if appropriate, coordinate communication modules being determined. The signal propagation time measurement is sufficiently well known per se. As a result of the fact that the cycle time of a transmission cycle is now variably adapted to the longest signal propagation time measured and the associated maximum permissible data transfer rate, use of the system bus may be optimized.

The cycle times may be defined when the monitoring and/or control system having a current configuration is started up for the first time. The results of the method, which is started manually, for example, are permanently stored after having been checked and, if appropriate, optimized, so that the communication modules and subordinate input/output modules can access said results during subsequent operation without the method having to be carried out again. The cycle times may be stored, for example, in EPROM (Electronical Programmable Read Only Memory) memories.

The cycle times are preferably defined during each boot phase for initializing and configuring the monitoring and/or control systems, with the result that the cycle times are reset each time and are adapted to the actual existing system environment if the monitoring/control system is initialized and configured again when it is switched on or changed. This ensures that the transmission cycle set is actually always adapted to the actually existing system environment.

The values for the minimum cycle time can preferably be defined as continuous values. This has the advantage that the cycle time can be variably set without being restricted to prescribed levels of data transfer rates. However, the values for the minimum cycle time are optionally also able to be defined in a stepwise manner.

With the communication module of the type mentioned initially, the object is also achieved by said module being set up to carry out the above-described method. To this end, means for determining the signal propagation times must merely be implemented, in a manner known per se, using hardware or software. The access times for optimizing the monitoring cycles are preferably determined using program algorithms in conjunction with mathematical algorithms or tables which are stored in the communication module.

BRIEF DESCRIPTION OF THE DRAWING

The invention will be explained by way of example in more detail below with reference to the accompanying drawing, in which.

DESCRIPTION OF THE PREFERRED EMBODIMENT

Figure 1:
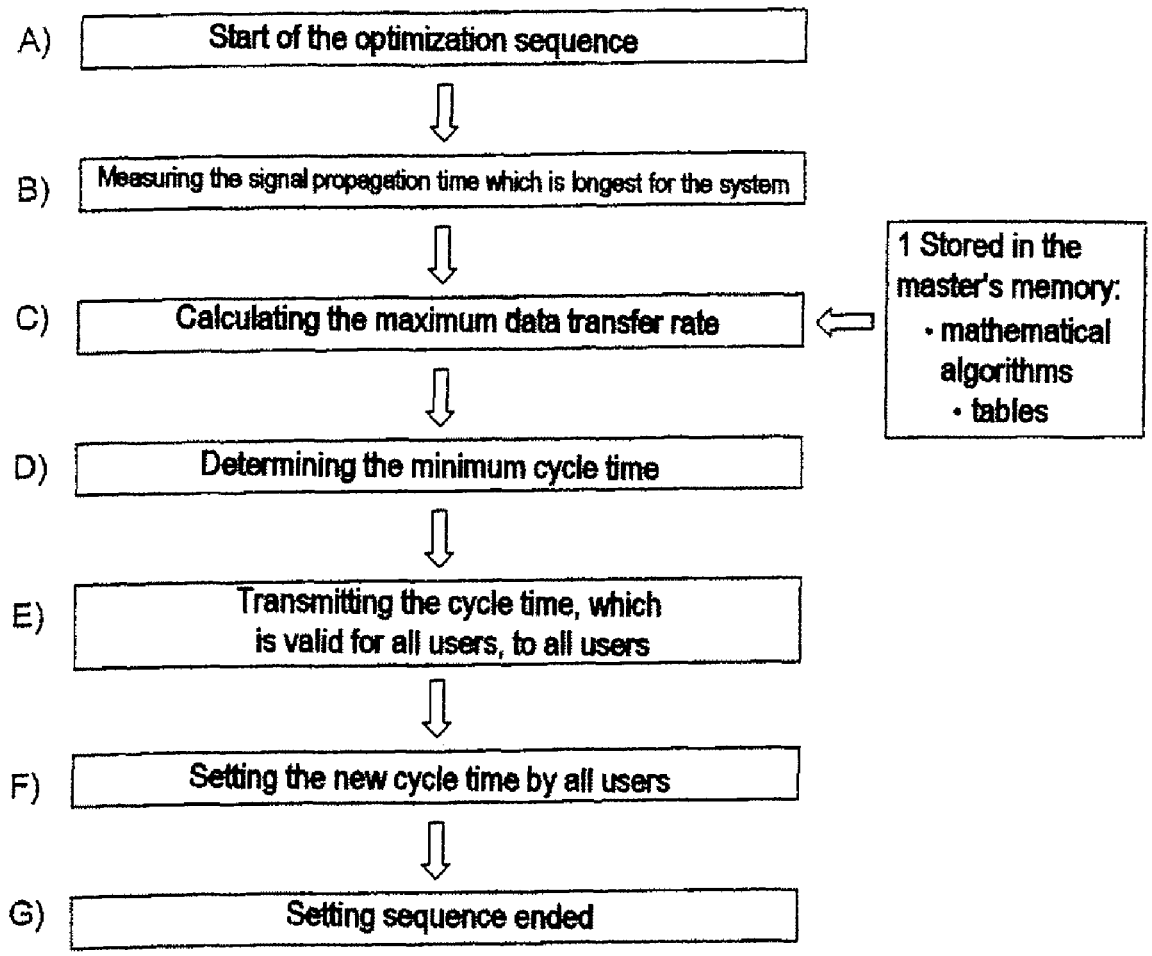
FIG. 1 shows a flowchart of the method for controlling the access times to a system bus.

FIG. 1 reveals a flowchart of a method for defining a cycle time for a transmission cycle on a system bus of a monitoring/control system, in particular a programmable control system. Provision is made of at least one communication module having a system bus interface to which at least one further input/output module for inputting and/or outputting measurement signals and/or control signals to field applications, such as sensors, engine controllers etc., is connected. A time control unit of the superordinate communication module controls communication on the system bus in such a manner that defined communication times for the communication and input/output modules which are connected to the system bus are defined in a transmission cycle that is constantly repeatedly carried out. That is to say the read and write cycles for the communication and/or input/output modules are permanently prescribed in the transmission cycle.

Propagation time differences restrict communication on the system bus on the basis of the line length of the system bus such that a maximum data transfer rate and an associated minimum cycle time of the transmission cycle must be prescribed. This cycle time is usually permanently set or is negotiated among the users of the system bus.

According to the present invention, the cycle time for a transmission cycle is centrally defined by the communication module, which contains the time control unit, by starting an optimization sequence (step A) in the boot phase for initializing and configuring the monitoring/control system. In this case, in step B), that signal propagation time which is longest for the monitoring/control system is measured by data in a communication module being sent to, and received from, each of the connected input/output modules and, if appropriate, coordinate communication modules and by the signal propagation times between the communication module and the input/output module or coordinate communication module being measured in a manner known per se. Mathematical algorithms or tables which are used to calculate (step D) the maximum data transfer rate for the monitoring/control system from the longest signal propagation time determined in step B) are stored in the memory of the communication module that defines the cycle time for the transmission cycle. The maximum data transfer rate at which signals can be transmitted on the system bus is then used to determine the minimum cycle time. This depends on the communication processes prescribed for each transmission cycle.

If appropriate, the minimum cycle time may also be determined on the basis of the number of communication and input/output modules connected to the system bus (step D).

In step E), the cycle time which is valid for all users is then transmitted to all users, so that a generally valid transmission cycle based on the maximum data transfer rate allowed for the specific monitoring/control system is variably prescribed.

The new cycle time is then set by all users in step F) and the optimization and setting sequence is ended in step G). The boot operation can then be continued and the monitoring/control system can be put into operation.

The invention claimed is:

1. A monitoring/control system for defining a cycle time for a transmission cycle on a system bus, comprising:
    at least one communication module and connected to the system bus; and
    at least one signal input/output module connected to the communication module via the system bus,
    wherein the at least one communication module has a time control unit for controlling a transmission cycle which is constantly repeatedly carried out by the communication module and the signal input/output modules, the transmission cycle comprising defined communication times for the communication module and the signal input/output modules to communicate signals through the system bus,
    wherein the time control unit is arranged to measure signal propagation times on the system bus and to define the cycle time for a transmission cycle on the system bus on the basis of the longest signal propagation time measured, and to transmit the defined cycle time to all of the signal input/output modules,
    wherein the measuring and defining includes
    a) measuring the signal propagation times on the system bus and, based on the measuring, determining the longest signal propagation time,
    b) determining the maximum signal transfer rate, based on said determined longest signal propagation time,
    c) determining the minimum cycle time of a transmission cycle based on said determined maximum signal transfer rate, and
    d) transmitting the minimum cycle time to all of the communication and signal input/output modules connected to the system bus, to control the access times to the system bus.

2. The system of claim 1, wherein the communication module having the time control unit is a superordinate module and the input/output modules are subordinate modules, and wherein the time control unit is arranged to measure the signal propagation times using the superordinate and subordinate arrangement via the system bus.

3. The system of claim 1, wherein the time control unit is arranged to define the cycle times when the monitoring/control system is started up for the first time, and the cycle times are permanently stored.

4. The system of claim 1, wherein the time control unit is arranged to define the cycle times during each boot phase for initializing and configuring the monitoring and/or control system.

5. The system of claim 1, wherein the time control unit is arranged to define the values for the minimum cycle time as continuous variables.

6. The system of claim 1, wherein the time control unit is arranged to define the values for the minimum cycle time in a stepwise manner.

7. A communication module for controlling signal transmission on a system having a system bus and at least one input/output module connected to the system bus, said communication module comprising:
  a system bus interface; and
  a time control unit for controlling a transmission cycle which is constantly repeatedly carried out by the communication module and the signal input/output modules, the transmission cycle comprising defined communication times for the communication module and the signal input/output modules to communicate signals through the system bus,
  wherein the time control unit is arranged to measure signal propagation times on the system bus and to define the cycle time for a transmission cycle on the system bus based on the longest signal propagation time measured, and to transmit the defined cycle time to all of the signal input/output modules,
wherein the measuring and defining the cycle time includes
measuring the signal propagation times on the system bus,
identifying the longest signal propagation time, based on the measured signal propagation times,
determining the maximum signal transfer rate, based on said determined longest signal propagation time,
determining the minimum cycle time of a transmission cycle based on said determined maximum signal transfer rate, and
transmitting the minimum cycle time to all of the communication and signal input/output modules connected to the system bus, to control the access times to the system bus.

* * * * *